United States Patent

Udagawa et al.

[11] Patent Number: 5,170,927
[45] Date of Patent: Dec. 15, 1992

[54] METAL PLATE WITH INTERSECTING BEADS

[75] Inventors: Tsunekazu Udagawa, Ichikawa; Yoshio Miyaoh; Itsuo Ishikawa, both of Tokyo, all of Japan

[73] Assignee: Ishikawa Gasket Co., Ltd., Tokyo, Japan

[21] Appl. No.: 809,176

[22] Filed: Dec. 18, 1991

[30] Foreign Application Priority Data

Dec. 21, 1990 [JP] Japan ............................ 2-404255[U]
Nov. 12, 1991 [JP] Japan ............................ 3-101019[U]

[51] Int. Cl.⁵ .................................................. F16J 15/08
[52] U.S. Cl. ............................ 277/235 B; 277/213; 277/236
[58] Field of Search ............... 277/235 B, 236, 213, 277/235 R, 207 R

[56] References Cited

U.S. PATENT DOCUMENTS

| | | | |
|---|---|---|---|
| 4,372,564 | 2/1983 | Nicholson | 277/235 B |
| 4,759,556 | 7/1988 | Udagawa | 277/235 B |
| 4,765,634 | 8/1988 | Kobayashi et al. | 277/213 |
| 4,791,897 | 12/1988 | Udagawa | 277/235 B |
| 4,815,750 | 3/1989 | Yoshino | 277/235 B |
| 4,861,047 | 8/1989 | Okano | 277/235 B |
| 4,869,515 | 9/1989 | Uchida | 277/235 B |

FOREIGN PATENT DOCUMENTS 0293362 7/1965 Netherlands .................. 277/235 B

*Primary Examiner*—William A. Cuchlinski, Jr.
*Assistant Examiner*—Daniel G. DePumpo
*Attorney, Agent, or Firm*—Kanesaka and Takeuchi

[57] ABSTRACT

A metal plate for a gasket is provided with a plurality of beads around portions to be sealed. The beads intersect with each other to form an intersecting portion, which has a central portion, an outer portion outside the central upper portion and at least three side portion extending between side edges of the beads adjacent to each other. At least two side portions are curved to orient toward the intersecting portion and are located on or inside a part of an imaginary circular line. A radius of the imaginary circular line is at least twice as much as the width of the bead. Therefore, when the metal plate is tightened, the central portion is at first compressed to support the outer portion outside the central portion to thereby provide surface pressure substantially the same as that on the bead outside the intersecting portion.

9 Claims, 1 Drawing Sheet

U.S. Patent
Dec. 15, 1992
5,170,927
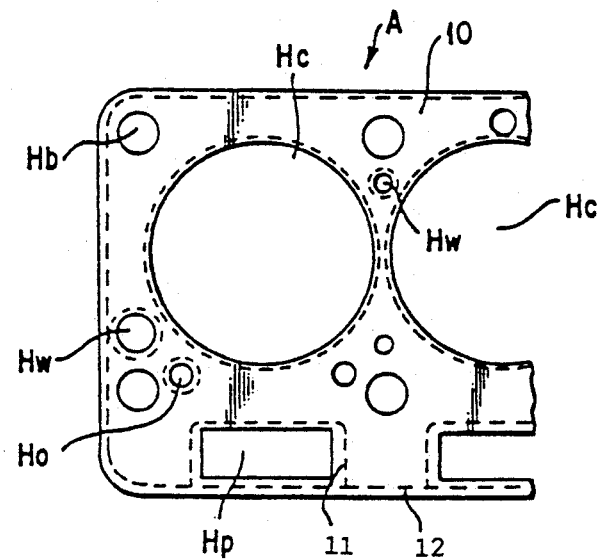
FIG. 1
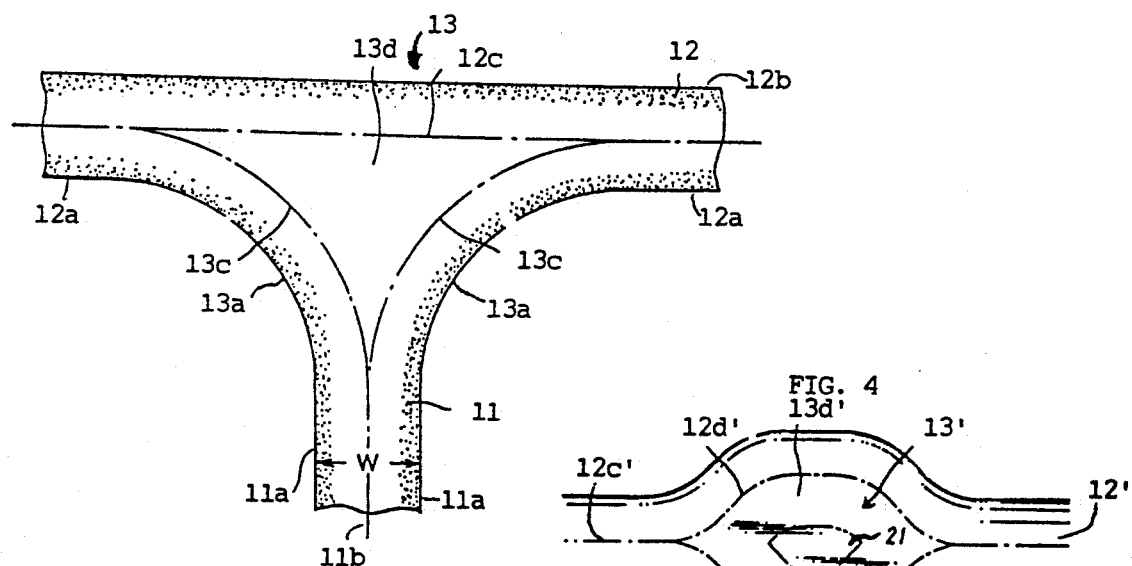
FIG. 2
FIG. 4
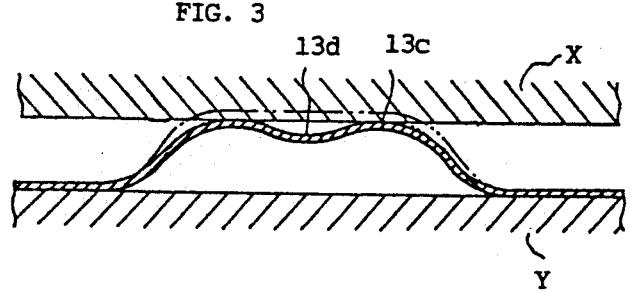
FIG. 3

METAL PLATE WITH INTERSECTING BEADS

BACKGROUND OF THE INVENTION AND RELATED ART STATEMENT

The present invention relates to a metal plate with intersection beads, in particular a structure of a metal plate at a portion where the beads intersect.

An internal combustion engine is provided with a plurality of holes therein, such as cylinder bores, water holes, oil holes, bolt holes, push rod holes and so on. Some of the holes must be securely sealed therearound to prevent leakage of fluid from the holes.

Therefore, when the engine parts, such as a cylinder head and a cylinder block, are connected together with a gasket installed therebetween, the gasket must have specific sealing means around the holes to securely seal therearound.

In a steel laminate gasket formed of a plurality of metal plates, beads are often formed as sealing means around the holes to be sealed. When the gasket with the bead is tightened, the bead is compressed to form a surface pressure thereat to seal around the hole.

In a gasket, sometimes, holes to be sealed are located very close to each other. In this case, it is impossible to form a separate bead for each hole, so that adjacent beads are combined, and a common portion of the beads are eliminated. As a result, two beads are intersected together.

When the two beads intersect, the intersecting portion of the two beads becomes eventually large. Therefore, when a plate with the intersecting portion of the two beads is compressed, the intersecting portion can not provide surface pressure equal to that formed on the rest of the beads. The surface pressure at the intersecting portion is generally weaker than the rest of the beads. Accordingly, leakage may occur at the intersecting portion of the beads.

In U.S. Pat. No. 4,861,047, a depression is formed at a middle of a intersecting portion of the beads to extend downwardly therefrom. The depression at the intersecting portion provides stiffness at that portion, so that the intersection portion can provide surface pressure substantially equal to the rest of the beads.

In U.S. Pat. No. 4,869,515, a depression is formed at an intersecting portion of the two beads to extend from one side of the beads to reduce the area of the intersecting portion.

The above patents operate as intended. However, it requires additional treatment to the beads.

Therefore, one object of the invention is to provide a metal plate with an intersecting portion of the beads, wherein the beads can provide equal surface pressure even at the intersecting portion of the beads.

Another object of the invention is to provide a metal plate as stated above, which can be formed very easily without substantial treatment.

Further objects and advantages of the invention will be apparent from the following description of the invention.

SUMMARY OF THE INVENTION

A metal plate for a gasket of the invention is formed of a main metal plate, which includes a plurality of beads formed around portions to be sealed. The beads intersect with each other to form at least one intersecting portion on the metal plate.

Each bead is defined by two side edges to form a width therebetween, wherein the bead extends upwardly from the side edges.

The intersecting portion includes a central portion, an outer portion outside the central portion and at least three side portions extending between the side edges of the beads adjacent to each other. At least two side portions are curved to project toward the intersecting portion and are located on or inside a part of an imaginary circular line with a curvature at least twice as much as the width of the bead. The center of the imaginary circular line is located outside the two beads and the intersecting portion.

Namely, in case two beads are intersected in a T-shape, the two side portions extending from a vertical bead to a horizontal bead are curved in a direction toward the intersecting portion. If the side portion is continuously curved, the curvature or radius of the side portion is the same as or greater than twice the width of the bead. If the two beads have different width, the curvature may be calculated based on the smaller bead.

The side portion need not be continuously curved. The middle of the side portion may extend linearly. However, the linear line of the side portion may be located inside the imaginary circular line. Namely, the intersecting portion must have a predetermined size.

When the metal plate with the intersecting portion as defined above is tightened, the central portion is at first compressed. Therefore, the central portion is pushed to a horizontal level of the main metal plate to support the outer portion outside the central portion. As a result, the outer portion is supported by the compressed central portion and the side portions of the intersecting portion. Therefore, the outer portion outside the central portion can provide surface pressure substantially the same as that on the bead outside the intersecting portion.

In the present invention, the intersecting portion is formed widely to provide high surface pressure area on a part of the intersecting portion, so that the part of the intersecting portion can provide sufficient surface pressure, which is substantially the same as that outside the intersecting portion of the bead.

The metal plate with the beads as explained above may be combined with other metal plates to form a steel laminate gasket.

BRIEF DESCRIPTION OF THE DRAWINGS

FIG. 1 is a partial plan view of a first embodiment of a metal plate for a gasket of the invention;

FIG. 2 is an enlarged plan view of an intersecting portion of two beads shown in FIG. 1;

FIG. 3 shows a condition that the intersection portion is partly compressed; and FIG. 4 is an enlarged plan view, similar to FIG. 2, of a second embodiment of the invention.

DETAILED DESCRIPTION OF PREFERRED EMBODIMENTS

Referring to FIGS. 1-3, a first embodiment A of a metal plate 10 for a gasket of the invention is shown. The metal plate 10 is a cylinder head gasket and is provided with a plurality of cylinder bores Hc, water holes Hw, oil holes Ho, bolt holes Hb, push rod holes Hp, and so on as in the conventional gasket.

Beads are formed around edges of the metal plate 10 as well as around the cylinder bores Hc, water holes Hw, oil holes Ho and push rod holes Hp, which is shown in dot lines in FIG. 1. The beads around the edges of the metal plate 10 and the push rod holes Hp are combined and interconnected together.

As clearly shown in FIG. 2, beads 11, 12 are intersected in a T-shaped to form an intersecting portion 13. The bead 11 has side edges 11a and a top portion 11b, while the bead 12 has side edges 12a, 12b and a top portion 12c. The side edges 11a extend to the side edges 12a along curved edges 13a of the intersecting portion 13. Also, the top portion 11b extends to the top portion 12c along curved portions 13c.

An area surrounded by the curved portions 13c and the top portion 12c is flat and forms a central portion 13d of the intersecting portion 13.

The curvature of the curved edge 13a is determined such that the radius of the curved edge 13a is twice the width W of the head 11. The length of twice the width W of a bead is a minimum length for the radius of the curved edge 13a. Preferably, the radius of the curved edge is between 2-20 times relative to the width W of the bead.

If the radius of the curvature is less than twice the width of the bead, the intersecting portion 13 is too small, so that the intersecting portion 13 can not provide sufficient surface pressure when tightened. On the other hand, if the radius of the curvature is more than 20 times relative to the width of the bead, the intersection portion 13 becomes too large, so that the intersecting portion 13 can not provide sufficient surface pressure when tightened.

When the plate 10 with the beads 11, 12 is situated between a cylinder head X and a cylinder block Y and is tightened therebetween, the intersecting portion 13 as well as the beads 11, 12 are compressed. As the beads 11, 12 and the intersection portion 13 are further compressed, the central portion 13d is pushed downwardly, as shown in FIG. 3.

As the plate 10 is further compressed, the central portion 13d abuts against the cylinder block Y, whereby the areas at the curved portions 13c and a part of the top portion 12c around the central portion 13d are supported by the compressed central portion 13d and the curved edges 13a and a part of the side edge 12b. Namely, surface pressure is formed at the curved portions 13c and the part of the top portion 12c in the intersecting portion 13, which is substantially equal to that formed on the beads 11, 12. Accordingly, the beads 11, 12 can provide substantially equal surface pressure throughout the beads 11, 12 and the intersecting portion 13.

Since the surface pressure on the beads 11, 12 is substantially equal, leakage at the intersecting portion 13 is securely prevented.

FIG. 4 shows a second embodiment B of the metal plate of the invention. The metal plate includes beads 11', 12' and an intersecting portion 13' as in the gasket A. However, a part of the bead 12' projects laterally at a side opposite to the bead 11' so that a center portion 13d' of the intersecting portion 13' is located in the center where top portions 11c', 12c' intersect.

Further, a curved edge 13a' between side edge 11a', 12a' of the bead 11', 12' includes a linear portion 13e', which is located laterally inside an imaginary line along edge 13a as defined in the gasket A. Namely, the intersecting portion 13' is enlarged further laterally beyond an imaginary line along edge 13a. Curved portions 13c' extend similar to the curvature of the curved edge 13a'.

In the gasket B, the intersecting portion 13' and the center portion 13d' are formed widely. Therefore, a portion 21 in the center portion 13d' is slightly dented downwardly so that the center portion 13d' can be compressed easily. When the gasket B is tightened, the center portion 13d' is compressed, and the curved portions 13c', 12d' provide surface pressure as in the beads 11', 12'. The gasket B operates as in the gasket A.

In the present invention, a relatively wide center portion is formed at the intersecting portion of the beads. Therefore, when the gasket is tightened, the center portion is compressed or deformed to support a portion around the center portion, which provides surface pressure substantially equal to that on the beads.

While the invention has been explained with reference to the specific embodiments of the invention, explanation is illustrative and the invention is limited only by the appended claims.

What is claimed is:
1. A metal plate for a gasket, comprising,
a main metal plate with an outer surface, and
a plurality of beads formed on the main metal plate around portions to be sealed, each bead having two side edges from which the bead projects outwardly from the outer surface, and a predetermined width between the two side edges, said beads intersecting with each other and having at lest one intersecting portion, said intersecting portion having a central portion situated in a center of the intersecting portion, an outer portion outside the central portion and at least three side portions to define and surround the intersecting portion, said side portions extending between the side edges, each of at least two side portions having at least one curved portion to communicate with the side edges adjacent to each other, said side portion being located on or laterally inside a part of an imaginary circular line contacting the side edges of the beads, said imaginary circular line having a radius of curvature such that a center of the circular line is located outside the intersecting portion and the radius of curvature is at least twice as much as the width of the bead so that when the metal plate with the intersecting portion is compressed, the central portion is at first compressed to support the outer portion outside the central portion to thereby provide surface pressure on the outer portion substantially the same as that on the bead outside the intersecting portion.

2. A metal plate according to claim 1, wherein said intersecting portion further includes a surface pressure generating portion communicating with tops of the beads, said surface pressure generating portion being located away from the side portion at a distance equal to a half width of the bead.

3. A metal plate according to claim 2, wherein two beads intersect in a T-shape to constitute a horizontal bead and a vertical bead, said central portion being surrounded by the surface pressure generating portion.

4. A metal plate according to claim 3, wherein a middle of each side portion extending from the vertical bead extends linearly, and two end portions of each side portion are curved.

5. A metal plate according to claim 3, wherein a portion of the horizontal bead at a side opposite to the vertical bead expands laterally outwardly so that the central portion is located at an intersection of center lines of the beads.

6. A metal plate according to claim 1, wherein said intersecting portion further includes a depression in a middle of the central portion so that when the metal plate is tightened, pressure is concentrated in the depression to firstly deform the central upper portion without deforming the outer portion.

7. A metal plate for a gasket, comprising, a main metal plate with an outer surface, and a plurality of beads formed on the main metal plate around portions to be sealed, each bead having two side edges from which the bead projects outwardly from the outer surface, and a predetermined width between the two side edges, said beads intersecting in a T-shape and having an intersecting portion with a shape similar to a triangle, said intersecting portion having a central portion situated in a center of the intersecting portion, an outer portion for surrounding the central portion and three side portions to define and surround the intersecting portion, said side portions extending between the side edges, two side portions being curved in a direction to decrease a size of the intersecting portion, said side portion having a radius of curvature at least twice as much as the width of the bead so that when the metal plate with the intersecting portion is compressed, the central portion is at first compressed to support the outer portion outside the central portion to thereby provide surface pressure on the outer portion substantially the same as that on the bead outside the intersecting portion.

8. A metal plate for a gasket, comprising, a main metal plate with an outer surface, and a plurality of beads formed on the main metal plate around portions to be sealed, each bead having two side edges from which the bead projects outwardly from the outer surface and a predetermined width between the two side edges, said beads intersecting together to form an intersecting portion, said intersecting portion having a central portion situated in a center of the intersecting portion, an outer portion to surround the central portion and at least three side portions to define and surround the intersecting portion, said side portions extending between the side edges, each of at least two side portions having two curved portions and one linear portion between the two curved portions to connect the side edges situated adjacent to each other, said curved portions with the linear portion being situated inside a part of an imaginary circle contacting the side edges, each circle having a radius of curvature such that a center of the radius of curvature is located outside the intersecting portion, said radius of curvature being at least twice as much as the width of the bead so that when the metal plate with the intersecting portion is compressed, the central portion is at first compressed to support the outer portion outside the central portion to thereby provide surface pressure on the outer portion substantially the same as that on the bead outside the intersecting portion.

9. A metal plate according to claim 1, wherein the radius of the imaginary circular line is between 2-20 times relative to the width of the bead.

* * * * *